July 29, 1969  M. D. ELMORE  3,458,705
RADIATION RESPONSIVE FLOW CONTROL APPARATUS
Filed Oct. 27, 1966

INVENTOR.
MARSHALL D. ELMORE
BY
ATTORNEY

United States Patent Office 3,458,705
Patented July 29, 1969

1

3,458,705
RADIATION RESPONSIVE FLOW CONTROL APPARATUS
Marshall D. Elmore, Norwalk, Calif., assignor to Beckman Instruments, Inc., a corporation of California
Filed Oct. 27, 1966, Ser. No. 589,934
Int. Cl. G01n 21/26
U.S. Cl. 250—218                         5 Claims

ABSTRACT OF THE DISCLOSURE

Flow control apparatus which is capable of maintaining a substantially constant flow rate of gas. The gas being controlled is passed through a capillary to produce a pressure differential across the legs of a manometer causing a change in the level of liquid in the manometer. A photoelectric cell detects the change in the level of the liquid and produces a current output which controls a fluid pump to maintain the flow of gas constant.

---

This invention relates generally to a flow control apparatus and, more particularly, to an apparatus for automatically regulating the flow of a gas stream.

In the field of gas analysis it is often required to regulate the rate of flow of the gas stream being analyzed. More specifically, in order to determine accurately the percentage of constituents in the gas stream being analyzed, it is desirable to have means for producing a continuous constant flow rate of the gas into the analytical instrument. While devices such as bubble flow meters have been provided in the past in connection with gas analysis equipment for measuring the flow rate of gas, such devices do not include means for maintaining the flow of gas constant.

It is, therefore, the principal object of the present invention to provide an improved apparatus for controlling the flow of a gas stream.

Another object of the present invention is to provide an improved flow control apparatus which is capable of maintaining a substantially constant flow rate of gas.

According to the principal aspect of the present invention, an apparatus is provided which is based upon the principle that a pressure differential across a capillary is directly proportional to the flow rate of gas passing through the capillary. This principle is embodied in the present invention by providing a manometer with a capillary connecting the upper portions of the legs of the manometer. A pump conveys the gas being monitored through the capillary to produce a pressure differential in the legs of the manometer. A change in such pressure differential resulting from a change in the output of the pump produces a change in the level of the liquid in the manometer. A device is provided for detecting the level of the liquid in the manometer. Such device produces a current output which is inversely proportional to the level of the liquid. The detecting device is electrically connected to the pump so that the change in current output of the detecting device produces a corresponding change in the output of the pump so that the output of the pump is maintained substantially constant.

2

Figure 1:
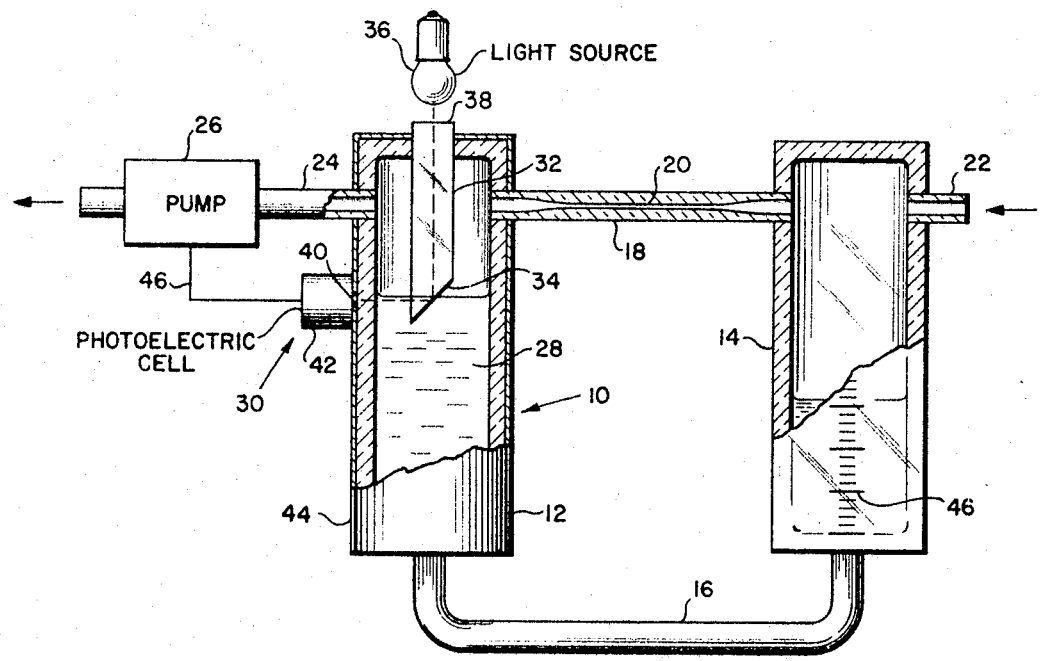
Figure 2:
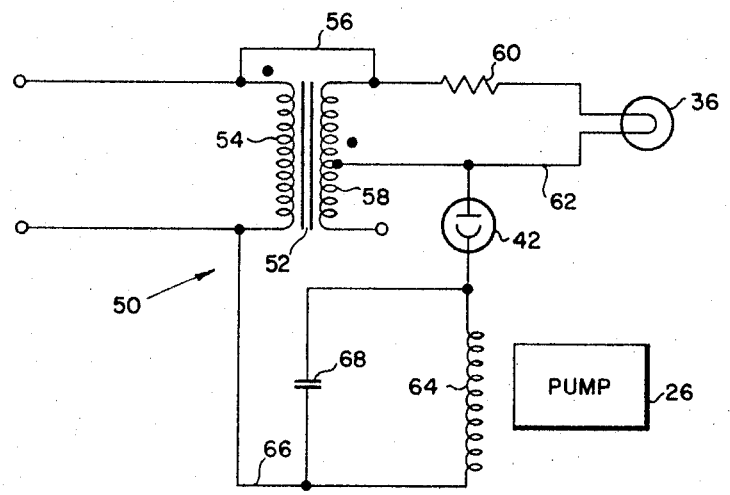

Other objects, aspects and advantages of the invention will become more apparent from the following description taken in connection with the accompanying drawings wherein:

FIG. 1 diagrammatically illustrates the apparatus of the invention, partially in section; and FIG. 2 discloses a suitable circuit for use with the apparatus of FIG. 1.

Referring now to the drawings in detail, the apparatus of the invention comprises a manometer, generally designated by numeral 10, having legs 12 and 14 formed of transparent material such as glass or Lucite which are interconnected at their lower portions by a conduit 16. The upper portions of the legs 12 and 14 are interconnected by conduit 18 which has a capillary 20 therein. The upper portion of the leg 14 of the manometer has a gas inlet port 22 while the upper portion of the leg 12 is connected via a conduit 24 to a pump 26 which pumps the gas being controlled. While the pump is shown as drawing the gas being controlled through the system, it is understood that the pump can also be located at the inlet port 22 to force the gas through the apparatus.

The manometer 10 is partially filled with a suitable manometric liquid 28, such as mineral oil. It can be appreciated that when the pump 26 conveys gas through the apparatus, including the capillary 20, a pressure differential is created in the upper portions of the legs 12 and 14 of the manometer, with the higher pressure obviously being in the leg 14 and the lower pressure in the leg 12. As indicated previously, the pressure differential is dependent upon the flow rate of gas passing through the system. Thus, any change in the flow rate will result in a proportional change in the pressure differential in the two legs 12 and 14, thus changing the level of manometric liquid in the legs.

Means are provided for detecting the change in the level of the liquid in the manometer, which means is generally referred to by numeral 30. Such means 30 includes a rod of transparent material 32, such as Lucite or transparent vitreous silica, which is mounted lengthwise in the leg 12 of the manometer on the low pressure side of the capillary 20. The end of the rod 32 disposed in the leg 12 is formed with a surface 34 which can be either reflecting or refracting and which extends at an angle of 45 degrees to the longitudinal axis of the rod 32 in leg 12. A suitable lamp 36 is positioned at the upper end of the rod 32 to provide a source of light for directing a beam of light through the rod 32 to the reflecting surface 34. Preferably the upper end 38 of the rod 32 is roughened while the angled reflecting surface 34 is highly polished to eliminate stray light sources. A light slit 40 is provided in the leg 12 for permitting the passage of light from the surface 34 to a photoelectric cell 42 positioned outside of the leg 12 adjacent to slit 40. The slit 40 is preferably formed by providing a light absorbant opaque coating 44 on the entire outer surface of the leg 12 with a portion of the coating removed to provide a thin narrow slit located approximately intermediate the upper and lower portions of the surface 34. If the leg 12 were formed of a light absorbant opaque material, rather than transparent glass or plastic, the slit 40 could be formed by cutting an opening in the wall of the leg and inserting a glass or transparent plastic insert therein to provide the light slit.

Preferably the position of the rod 32 and the leg 12 is such that approximately half of the surface 34 on the rod 32 is submerged in the manometric liquid 28 under normal rates of flow of gas through the apparatus. It can be appreciated that when the rate of flow of gas changes, the pressure differential across the capillary 20 will vary, thus varying the level of the liquid 28. This will result in a change from reflection of the light as it contacts the surface 34 to refraction of the light through the surface-liquid interface, or vice versa, thus changing the intensity of the light passing through the slit 40 to the photoelectric cell 42. This results in a change in the current output of the photoelectric cell which is connected by a conductor 46 to an induction coil (not shown in FIG. 1) which controls the pump causing a proportional change in the output of the pump.

Possibly the operation of the invention can be best understood by considering the condition when the level of liquid 28 in the manometer 10 is as shown in the drawing, namely, slightly above the slit 40. If the pump 26 has a constant output, the level of the liquid 28 will remain as shown. However, if the output of the pump 26 decreases slightly causing a decrease in the flow rate of the gas, the resultant decrease in pressure differential on the opposite sides of the capillary 20 will result in a decrease in the level of the liquid 28 in the leg 12 of the manometer. As the level of the liquid drops, less of the light is refracted and more is reflected so that the intensity of the light passing to the photocell 42 increases in an amount proportional to the change in level of the liquid. It is understood that the change in intensity of the light is not abrupt but inversely proportional to the change in the level of the liquid and, therefore, varies as an inverse function of the rate of flow of gas through the apparatus. Thus, with a drop in the liquid level in leg 12 and a consequent increase in intensity of the light impinging upon the photoelectric cell 42, the current output of the cell increases, thereby increasing the current delivered to the pump 26. The pump, therefore, increases its output to the point that the level of liquid 28 in the manometer remains constant. Thus, by the present invention there is provided a means for automatically providing a substantially continuous constant flow rate of gas.

The flow rate of the pump may be altered by changing the size of the capillary 20 between the legs of the manometer 10 or by vertical adjustment of the legs of the manometer. Also, the transparent manometer leg 14 may be provided with graduated markings 46 as shown in FIG. 1 to provide means for indicating the level of the liquid in the leg 14 and, therefore, an indication of the rate of flow of gas through the system. Thus, by the present invention not only is there means for maintaining a constant flow of gas but also means for indicating by visual observation the rate of flow of gas.

Turning now to FIG. 2, there is illustrated a suitable circuit 50 for the apparatus in FIG. 1. The circuit comprises a filament transformer 52 with the primary winding 54 connected to a suitable source of alternating current, not shown. The primary winding 54 is connected by a conductor 56 to the secondary winding 58 of the transformer to deliver a step-up voltage to the lamp 36. The lamp is connected in series with a resistor 60 to the transformer center tap 62. The pump 26 is preferably of a type which is operated by an induction coil. Such a coil 64 is connected in series with the photoelectric cell 42 across the windings of the transformer 52 by a conductor 66. A capacitor 68 is connected in parallel with the induction coil 64 to provide an electromechanical parallel resonant circuit. As the output of the photoelectric cell 42 varies, the magnetic field produced by the induction coil 64 varies by a proportional amount thus altering the output of the pump 26.

An apparatus has been constructed as described herein. Such apparatus incorporated a Lucite rod 32 of ½ inch diameter and 4 inches in length with the surface 34 cut at an angle of 45 degrees to the longitudinal axis of the rod. The leg 12 in the manometer was formed of glass but provided with an opaque coating of black vinyl plastic on its outer surface except for a $\frac{3}{32}$ inch by ½ inch slit adjacent the reflecting surface 34. The capillary passage 42 and rate of flow of gas passing through the system were selected to provide a pressure head of approximately 4 to 5 inches in the legs 12 and 14 of the apparatus. The pump was a Beckman No. 314206 Vibrator Pump sold by Beckman Instruments, Inc. The photoelectric cell was a Delco LDR–25, the lamp 36 a GE No. 57 bulb, the transformer 52 a Traid F–40X, 28 volts center-tapped, the resistor was 33 ohms and 2 watts, and the capacitor was 1 μfd. and 400 volts, with the circuit connected to a regulated 115 v., 60 cycle electrical source. The aforementioned apparatus has been operated continuously for six months with no noticeable variation in the rate of flow of gas passing through the system as monitored from time to time by a standard bubble flow meter. Thus, by the present invention it is seen that an extremely close control of the output of a pump may be maintained for an extended period of time.

It is understood that the legs 12 and 14 need not be positioned side-by-side as shown in FIG. 1 but may be arranged in various forms as, for example, the legs could be concentrically mounted with leg 12 mounted inside leg 14 with an opening in the bottom of leg 12 providing flow communication between the two legs.

Although only a single embodiment of the invention has been disclosed herein for purposes of illustration, it will be understood that various changes can be made in the form, details, arrangements and proportions of these various parts in such embodiment without departing from the spirit and scope of the invention as defined by the appended claims.

What is claimed is:

1. An apparatus for controlling the flow of a gas comprising:
   a manometer having a pair of legs interconnected at their lower ends and adapted to hold a manometric liquid;
   flow means connecting the upper portions of said legs, said flow means having a capillary therein;
   pump means for converging a gas through said flow means and capillary whereby a pressure differential is created in said legs;
   means for detecting the level of manometric liquid in one of said legs, said means producing a current output which varies as an inverse function of said level and, therefore, said pressure differential, said liquid level detecting means including
      a transparent light conducting rod disposed longitudinally in said one of said legs;
      the end of said rod in said one of said legs having a surface disposed at an angle to the longitudinal axis of said rod;
      a light source at the other end of said rod for directing a beam of light through said rod to said surface;
      a portion of said one of said legs adjacent to said surface being transparent so as to pass light reflected from said surface to a point outside said one of said legs;
      photoelectric means outside said one of said legs at said point; and
   means electrically connecting said photoelectric means to said pump means for varying the output of said pump means.

2. An apparatus as set forth in claim 1 wherein the wall of said one of said legs is substantially opaque except for said portion thereof.

3. An apparatus as set forth in claim 1 wherein said surface is disposed at an angle of 45 degrees to said axis of said rod, 4. An apparatus for controlling the flow of a gas comprising:
   a manometer having a pair of legs interconnected at their lower ends and adapted to hold a manometric liquid;
   flow means connecting the upper portions of said legs, said flow means having a capillary therein;
   pump means for conveying a gas through said flow means and capillary whereby a pressure differential is created in said legs;
   a transparent light conducting rod positioned longitudinally in the leg at the low pressure side of said capillary, a surface being formed at the end of said rod in said leg and extending at an angle of about 45 degrees to the longitudinal axis of said rod;
   a light source positioned at the other end of said rod for directing a beam of light through said rod to said surface;
   said leg at the low pressure side of said capillary having substantially opaque walls except for a light slit therein adjacent to said surface;
   a photoelectric cell outside said leg adjacent to said slit for receiving light reflected from said surface through said slit; and
   means for electrically connecting said photoelectric cell to said pump means.

5. An apparatus as set forth in claim 4 including vertically extending graduated markings on the leg at the high pressure side of said capillary, and said leg being formed of a transparent material so that the level of said liquid with respect to said markings may be observed as an indication of the rate of flow of gas conveyed by said pump means.

References Cited

UNITED STATES PATENTS

| 1,910,202 | 5/1933 | Crago | 103—21 |
| 1,955,315 | 4/1934 | Styer. | |
| 2,197,205 | 4/1940 | Cooper | 250—218 |
| 2,408,851 | 10/1946 | Hillier et al. | 103—21 |
| 2,588,672 | 3/1952 | Turvey | 250—218 |
| 2,701,854 | 2/1955 | Carrick | 73—401 |
| 2,817,237 | 12/1957 | Stevens | 250—218 |
| 2,944,488 | 7/1960 | Meyer | 103—21 |

FOREIGN PATENTS 703,430   2/1954   Great Britain.

OTHER REFERENCES

IBM Technical Disclosure Bulletin, Freemen, vol. 5, No. 1, June 1962, p. 81.

WALTER STOLWEIN, Primary Examiner

U.S. Cl. X.R.

103—21; 250—227